United States Patent [19]
Robertson et al.

[11] Patent Number: 6,031,868
[45] Date of Patent: Feb. 29, 2000

[54] ASYMMETRIC DIGITAL SUBSCRIBER LOOP TRANSCEIVERS

[75] Inventors: David Hall Robertson, Boxford; David B. Ribner, Andover, both of Mass.

[73] Assignee: Analog Devices, Inc., Norwood, Mass.

[21] Appl. No.: 08/951,945

[22] Filed: Oct. 17, 1997

[51] Int. Cl.⁷ ............................... H04B 1/38; H04L 5/16
[52] U.S. Cl. ........................ 375/222; 375/219; 375/220
[58] Field of Search .................................. 375/222, 220, 375/219, 260; 370/295, 302

[56] References Cited

U.S. PATENT DOCUMENTS

| | | | |
|---|---|---|---|
| 5,317,596 | 5/1994 | Ho et al. ..................................... | 375/14 |
| 5,557,612 | 9/1996 | Bingham ..................................... | 370/71 |
| 5,790,514 | 8/1998 | Marchok et al. ......................... | 370/208 |
| 5,909,463 | 6/1999 | Johnson et al. .......................... | 375/220 |

FOREIGN PATENT DOCUMENTS

| | | | |
|---|---|---|---|
| 2 311 196 | 9/1997 | United Kingdom .............. | H04J 3/10 |
| WO 97/34390 | 9/1997 | WIPO .............................. | H04L 5/14 |

OTHER PUBLICATIONS

Younce et al. "Echo Cancellation For Asymmetrical digital Subscriber Lines", Serving Humanity Through Commu-cations, Supercomm/ICC, New Orleans, May 1994, IEEE, vol. 1, pp 301–306.

"ADSL–Modems", Funkschau, vol. 1, No. 6, Feb. 28, 1997, pp 44–47.

PCT Search Report Mailed May 17, 1999 in Connection with Counterpart application PCT/US 98/21698.

*Primary Examiner*—Stephen Chin
*Assistant Examiner*—Mohammad Ghayour
*Attorney, Agent, or Firm*—Fish & Richardson P.C.

[57] ABSTRACT

An asymmetrical modem system wherein a modem at a first location transmits information to a modem at a second location on a downstream signal and the modem at the second location transmits information to the modem at the first location on an upstream signal. The system includes a first location transmitter section, having an N-point inverse frequency transform, for converting information into the downstream signal having up to (N/2)–1 carriers. A second location transmitter section having, an [(NL)/(2K)-point inverse frequency transform, converts information into the upstream analog signal having up to [(NL)/(2K)]–1 carriers, where K is the ratio of downstream signal bandwidth to upstream signal bandwidth and L is greater one. A receiver section at the first location, having an [NM/K]-point frequency transform, separates the upstream signal into up to [(NM)/(2K)]–1 upstream carriers, where M is greater than one. A receiver section at the second location, having an N-point frequency transform, separates the downstream analog signal into up to (N/2)–1 downstream carriers.

24 Claims, 4 Drawing Sheets

US-TX SIGNAL USING 8X
INTERPOLATOR AT RT MODEM

ASYMMETRIC DIGITAL SUBSCRIBER LOOP TRANSCEIVERS

BACKGROUND OF THE INVENTION

This invention relates generally to asymmetric digital subscriber loop (ADSL) transceivers and more particularly to discrete multi-tone (DMT) asymmetric digital subscriber loop (ADSL) transceivers.

As is known in the art, ADSL modems achieve full-duplex operation over a single pair of subscriber loop (i.e., twisted pair telephone line) through the use of either frequency-division-multiplexing (FDM) or echo cancellation (EC). ADSL modems use DMT, a multi-carrier modulation technique, to achieve high bandwidth efficiency over a 1.1 Mhz bandwidth. An ADSL transceiver system generally includes a modem at a central station, or office, adapted to transmit information in a downstream signal to a modem at a remote terminal and to receive information in an upstream signal transmitted by the modem at the remote terminal. The upstream and downstream signals pass through a common transmission medium, typically the twisted-pair telephone line. The upstream signal and the downstream signal have different (i.e., asymmetric) bandwidths, the ratio of the downstream signal bandwidth to the upstream signal bandwidth being K, where K is greater than one. More particularly, with the current ANSI ADSL standard, the downstream signal bandwidth is eight times wider than the upstream signal bandwidth; i.e., K=8. This frequency bandwidth asymmetry is intended to accommodate a large downstream signal data rate to support data-hungry applications such as video-on-demand and Internet access, and a low upstream signal data rate for interactive control and basic—rate IDSN. In terms of the multi-carrier modulation, the downstream band consists of carriers 1–255 whereas the upstream consists of only carriers 1–31. In actual practice, the first 6 to 8 carriers are used as a guard-band for plain ordinary telephone service (POTS). An echo-cancellation based system makes use of the carrier allocation just mentioned above, however, FDM systems avoid the overlap of upstream and downstream by using a carrier assignment such as 32–255 for downstream and 8–28 for upstream, for example.

One DMT FDM ADSL system 10, shown in FIG. 1, is adapted to exchange information between a modem 12 at a first station, here a central office (CO), and a modem 14 at a second station, here a remote terminal (RT), through a common communication medium 16, here a twisted-pair telephone line. The system 10 includes: a transmitter section 18, at the central office modem 12, for distributing a first stream of data on line 13 among a plurality of, P, carriers. More particularly, the transmitter section 18 of the central office modem 12 includes a modulator 20 for receiving frames of the data on line 13 and for distributing such data over carriers 32 through 255. The modulator 20 includes a Quadrature Amplitude Modulation (Q.A.M.) encoder 24 and an Inverse Fast Fourier Transformer (I.F.F.T.) 26 arranged in a conventional manner as shown. The I.F.F.T. 26 is an N point, here 512 point I.F.F.T. Thus, the incoming data on line 13 is selectively encoded by the Q.A.M. encoder 24 at a frame rate, $f_r$, here about 4 kHz (more precisely, 4.0588 Khz) and the I.F.F.T. 26 produces, for each frame, a sequence of digital samples on line 22 at a rate $f_s=N f_r$ where here N is 512. More particularly, the sequence of digital samples on line 13 is encoded by Q.A.M. encoder 24 onto the 255 conjugate data pairs on input lines $28_1$–$28_{512}$ of the I.F.F.T. 26 as a sequence of frames, here at a frame rate of about 4 Khz. It should be noted that the I.F.F.T. 26 has 512 frequency bins a pair of which correspond to each one of the 255 carriers for a total of 510 bins with the remaining two bins, i.e., bins 1 and 257, corresponding to DC and $f_s/2$, respectively. Each carrier is associated with a pair of input lines on bus $28_1$–$28_{512}$. Here, carrier 1, at 4.3125 kHz, is associated with the conjugate data on lines $28_2$ and $28_{512}$, carrier 2 is associated with the conjugate data on lines $28_3$ and $28_{511}$, carrier 3 is associated with the conjugate data on lines $28_4$ and $28_{510}$, . . . , carrier 255, corresponding to 1.1 MHz is associated with the conjugate data on lines $28_{256}$, $28_{258}$. Thus, for each frame of data fed to lines $28_1$–$28_{512}$ a sequence of digital samples is produced by the I.F.F.T. 26 on line 22 at a sampling rate of about $f_s=2.208$ MHz. As noted above, here the FDM system 10 will transmit only carriers 32–255 in the downstream signal and carriers 8–28 in the up-stream signal.

The transmitter section 18 of the central office modem 12 also includes: a digital to analog converter (DAC) 30 for converting the sequence of samples of digital samples into a corresponding analog signal on line 32 at a rate $f_s$; and a band pass filter 34, fed by the analog signal and having a pass band extending over carriers 32–255 for producing, after passing through a conventional isolation hybrid 36 the downstream signal on the common communication medium 16 with a bandwidth extending over the P carriers 32 through 255.

The remote terminal modem 14 includes a receiver section 40 having: a band pass filter 42, coupled to the common communication medium 16 via a hybrid 37, for passing signals in the downstream signal fed thereto by the central office modem 12 transmitter section 18. As noted above, the data in the downstream signal extends over the P carriers 32 through 255). An analog to digital converter (ADC) 44 is provided for converting the signals passed by the band pass filter 42 into a sequence of digital data on bus 46. The data on line 46 is produced at the sampling rate, $f_s$. The data on line 46 is fed to a demodulator 47. The demodulator 47 includes a Time Domain Equalizer (T.D.Q.) 50 followed by a Fast Fourier Transformer (F.F.T.) 48 followed by a Frequency Domain Equalizer (T.D.Q.) 49 and Q.A.M. demodulator 45. The F.F.T 48 is fed by the sequence of data samples produced by the T.D.Q. 50 and separates such digital data fed thereto into P carriers 32 through 255. More particularly, the F.F.T. 48 provides a 512 point transform on the analog signal produced on line 46 by the ADC 44 to separate the analog signal on line 46 into 255 frequency bins. The conjugate data on pairs of lines $51_2$, $51_{512}$ correspond to carrier 1, the conjugate data on lines $51_3$, $51_{511}$ correspond to carrier 2, . . . , the conjugate data on pairs of lines $51_{33}$ and $51_{481}$ correspond to carrier 32, the conjugate data on pairs on lines $51_{34}$ and $51_{480}$ correspond to carrier 33, . . . and, the conjugate data on pairs of lines $51_{256}$ and $51_{258}$ correspond to carrier 255. As noted above, the downstream signal will only be in carriers 32–255. The data on lines $51_{33}$–$51_{256}$ (corresponding to carriers 32–255) is processed by the F.D.Q. 49 and Q.A.M. demodulator 45 into a signal on line 54 which, ideally, corresponding to the stream of data on line 13.

The remote terminal modem 14 includes a transmitter section 60, for distributing a second stream of data fed to the remote terminal modem 14 on line 63 among the P' carriers 8 through 28. More particularly, the transmitter section 60 includes a modulator 62 for receiving data on line 63 and for distributing such data over carriers 8 through 28. The modulator 62 includes a Quadrature Amplitude Modulation (Q.A.M.) encoder 64 and an Inverse Fast Fourier Transformer (I.F.F.T.) 66 arranged in a conventional manner as shown. The I.F.F.T. 66 is a 64 point I.F.F.T. Thus, the I.F.F.T. 66 produces for each frame on line 63 arranged a sequence of digital samples at a rate $f_s = N f_r/8$. More particularly, a sequence of digital samples on line 63 is encoded by Q.A.M. encoder 66 as a sequence of frames, here at a frame rate of about 4 kHz. It should be noted that the I.F.F.T. 66 has 31 frequency bins, or carriers. Each carrier is associated with a pair of input lines $68_1$–$68_{64}$. Here, carrier 1, corresponding to 4.3125 kHz, is associated with the conjugate data on lines $68_2$ and $68_{64}$, carrier 2 is associated with the conjugate data on lines $68_3$ and $68_{63}$, carrier 3 is associated with the conjugate data on lines $68_4$ and $68_{62}$, . . . , carrier 31 is associated with the conjugate data on lines $68_{32}$, $28_{34}$. Here, however, the upstream signal includes only carriers 5 through 28. For each frame of data fed to lines $68_1$–$68_{64}$, a sequence of digital samples is produced by the I.F.F.T. 66 on line 70 at a rate of $f_s/8$. It is noted that the sequence of digital samples fed to each one of the lines $68_1$–$68_{64}$ at the approximately 4 kHz frame rate $f_r$ appear in one of the 31 carriers of the upstream signal, it being understood that only carriers 8–28 are used in the F.D.M. system.

The transmitter section 60 of the remote terminal modem 14 also includes: a digital to analog converter (DAC) 72 for converting the sequence of samples of digital samples produced by I.F.F.T. 66 into a corresponding analog signal on bus 94. A lowpass filter 96 is fed by the analog signal and has a bandwidth extending over carriers 1 through 28, for producing, after passing through a conventional isolation hybrid 37, on the common communication medium 16, the upstream signal having a bandwidth extending over carriers 8 through 28.

The central office modem 12 includes a receiver section 80 having: a lowpass filter 82, coupled, via the isolation hybrid 36, to the common communication medium 16, for passing signals in the upstream signal fed thereto by the remote terminal modem 14 extending over the P carriers 8 through 28. An analog to digital converter 84 is provided for converting the signal passed by the lowpass filter 82 into a sequence of digital data on line 86 at the sampling rate, $f_s/8$. A demodulator 91 is fed the data on line 86. The demodulator 91 includes a Time Domain Equalizer (T.D.Q.) 85, a 64-point F.F.T. 92, a F.D.Q. 93 and a Q.A.M. demodulator 97. The F.F.T. 92 separates the analog signal on line 86 into 31 frequency bins, or carriers on lines $95_1$–$95_{64}$, it being understood that only signals in carriers 8–28 are allocated in the FDM system. The F.F.T. 92 operates at a rate $f_s/8$, to produce frames of data at the approximately 4 kHz frame rate among carriers 1 through 31; it being understood that the data of interest will appear in the P' carriers 8 through 28 for the FDM system example. That is, the F.F.T. 92 separates the signal on line 86 into the carriers 1–31 (it being understood that only carriers 8 through 28 are of interest). The F.D.Q. 93 and Q.A.M. demodulator 97 process the data produced by the F.F.T. 92 into a signal on line 94 which, ideally, corresponds to the data on line 63.

It should be noted that because the transform size (or dimension) used for the upstream signal (i.e., a 64 point transform) is different from the transform size used for the downstream signal (i.e., a 512 point transform), the downstream signal bandwidth of 255 carriers extends to $f_s/2$ and the upstream signal bandwidth of carriers 8–28 extends to nearly $f_s/16$. Thus, considering first the upstream signal produced by the remote terminal modem 14, it is first noted that the upstream signal has a bandwidth from carrier 8 through 28. However, the data produced on line 70 by modulator 62 also includes images which repeat at the rate of data are produced on line 70; i.e., at a rate $f_s/8$. Thus, images of carriers 8–28 repeat at the frequency $f_s/8$. It is noted that such images extend into the bandwidth of the downstream signal, i.e., into carriers 32 through 255. These un-wanted images are filtered, to some extent, by the upstream transmit low-pass filter 76 and the hold effect of the DAC 72, but they are not removed altogether. The amount of filtering is limited since the use of high-order analog filters for filter 96, in addition to being expensive, also have long impulse responses that introduce excessive intersymbol interference and degrade modem performance. The remaining images pass through the hybrid 37 with some limited attenuation, and appear, as noted above, directly within the band (i.e., carriers 32 through 255) occupied by the downstream signal thereby causing interference. It is noted that the attenuation in the downstream signal increases at higher signal frequencies so that the echo signal from the DAC 72 images can exceed the level of the received downstream signal. As a result, severe degradation of the downstream signal to noise ratio (SNR) may result.

A similar problem occurs at the central office modem 18. At the central office modem, the ADC 84 sampling rate, $f_s/8$, is one-eighth that of the sampling rate, $f_s$, of the downstream signal. That is, samples are produced by ADC 84 on bus 86 at a rate, $f_s/8$, whereas samples are produced by the downstream DAC 30 at the rate $f_s$. It is noted that these images, centered at multiples of the upstream sampling rate, $f_s/8$, of the ADC 84 occupy the frequency spectrum of carriers 32 through 255, i.e., the frequencies of the downstream signal. Clearly, with limited hybrid 36 attenuation, the downstream signal will be aliased by the ADC 84 and will fall directly within carriers 8–28 causing interference with the upstream signal.

SUMMARY OF THE INVENTION

In accordance with the present invention, an asymmetric digital subscriber loop system is provided. The system includes a first location (e.g. a central office) transmitter section. The first location office transmitter section includes a modulator, having an RN-point inverse frequency transform, for converting information into a downstream analog signal having a plurality of, P, downstream carriers. A second location, (e.g. a remote station) includes a receiver section having a demodulator, having an QN-point frequency transform, for separating the downstream analog signal into the P downstream carriers, where either R or Q is greater than one.

In accordance with another feature of the invention, the second location transmitter section includes a modulator, having an [N/K]L-point inverse frequency transform, for converting information into an upstream analog signal having a plurality of P' upstream carriers, where P' is less than P, where K is the ratio of the downstream signal bandwidth to upstream signal bandwidth and where L is greater than one. A receiver section at the first location includes a demodulator, having an [N/K]M-point frequency transform, for separating the upstream analog signal into the P' upstream carriers. A receiver section at the second location includes a demodulator, having an N-point frequency transform, for separating the downstream analog signal into the P downstream carriers.

With such an arrangement, a discrete multi-tone, asymmetrical modem system is provided wherein a modem at a first location transmits information to a modem at a second location on a downstream signal and the modem at the second location transmits information to the modem at the first location on an upstream signal. The upstream and downstream signals pass through a common transmission medium. The upstream signal and downstream signal comprise data in different bandwidths within a predetermined band of frequencies. Interference between the upstream and downstream signals arising from imaging and aliasing effects are reduced through the use of equal or oversized dimension transforms to, in effect, oversample the upstream signal and optionally the downstream signal. That is, the upstream signal is sampled at a rate greater than the highest frequency in the band of frequencies carrying data to be transmitted to the central office.

In accordance with another feature of the invention, asymmetrical modem system is provided wherein a modem at a first location transmits information to a modem at a second location on a downstream signal and the modem at the second location transmits information to the modem at the first location on an upstream signal. The upstream and downstream signals pass through a common transmission medium. The upstream signal and downstream signal occupy different bandwidths of a predetermined band of frequencies. The system includes a first location transmitter section. The first location transmitter section includes a modulator, having an N-point inverse frequency transform, for converting information into the downstream signal having P carriers. A second location transmitter section includes a modulator, having, an [N/K]L-point inverse frequency transform, for converting information into the upstream analog signal having P' carriers, where P' is less than P, where K is the ratio of downstream signal bandwidth to upstream signal bandwidth, and where L is greater than one. A receiver section at the first location includes a demodulator, having an [N/K]M-point frequency transform, for separating the upstream signal into P' upstream carriers, where M is greater than one. A receiver section at the second location includes a demodulator, having an N-point frequency transform, for separating the downstream analog signal into P downstream carriers.

In one embodiment of the invention, an interpolator is provided after the second location [N/K]L-point inverse frequency transform. The interpolator has an interpolation factor J, where J is equal to, or greater than one. A decimator is provided before the first location frequency transform. The decimator has an decimation factor D, where D is equal to, or greater than one.

In accordance with another feature of the invention, oversampled analog to digital conversion and decimation are provided at the first location modem receiver.

With such an arrangement, by producing the digital samples at a rate greater than the highest frequency in the downstream signal, aliasing of the downstream receiver which may couple into the receiver at the first location from its transmitter are increased and then effectively filtered by the decimator to thereby increase the isolation to the downstream signal from the first location receiver.

BRIEF DESCRIPTION OF THE DRAWING

Other features of the invention, as well as the invention itself will become more readily apparent with reference to the following detailed description taken together with the following drawings, in which.

DESCRIPTION OF THE PREFERRED EMBODIMENTS

Figure 1:
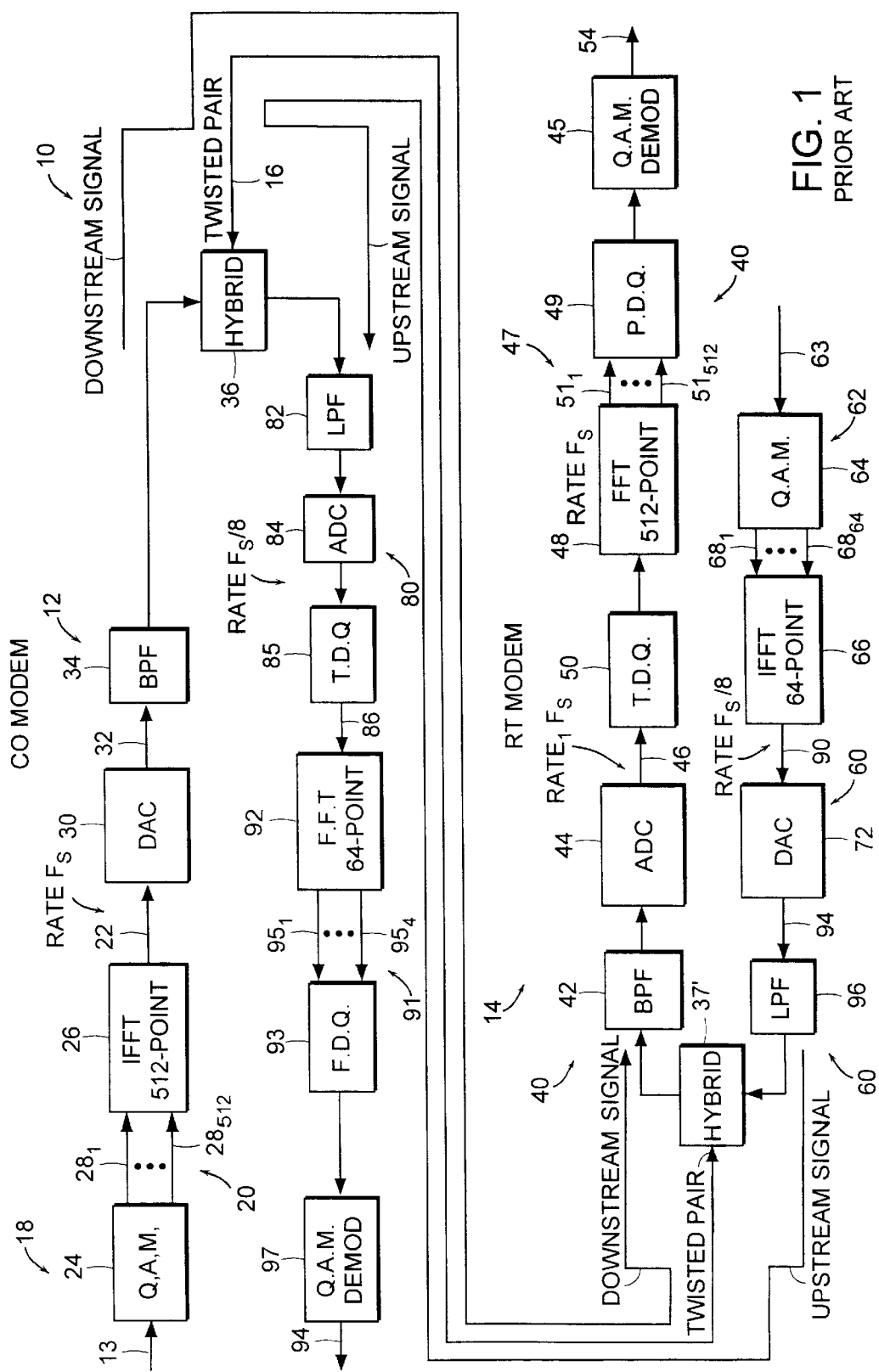
FIG. 1 is a block diagram of a DMT ADSL system according to the PRIOR ART.
Figure 2:
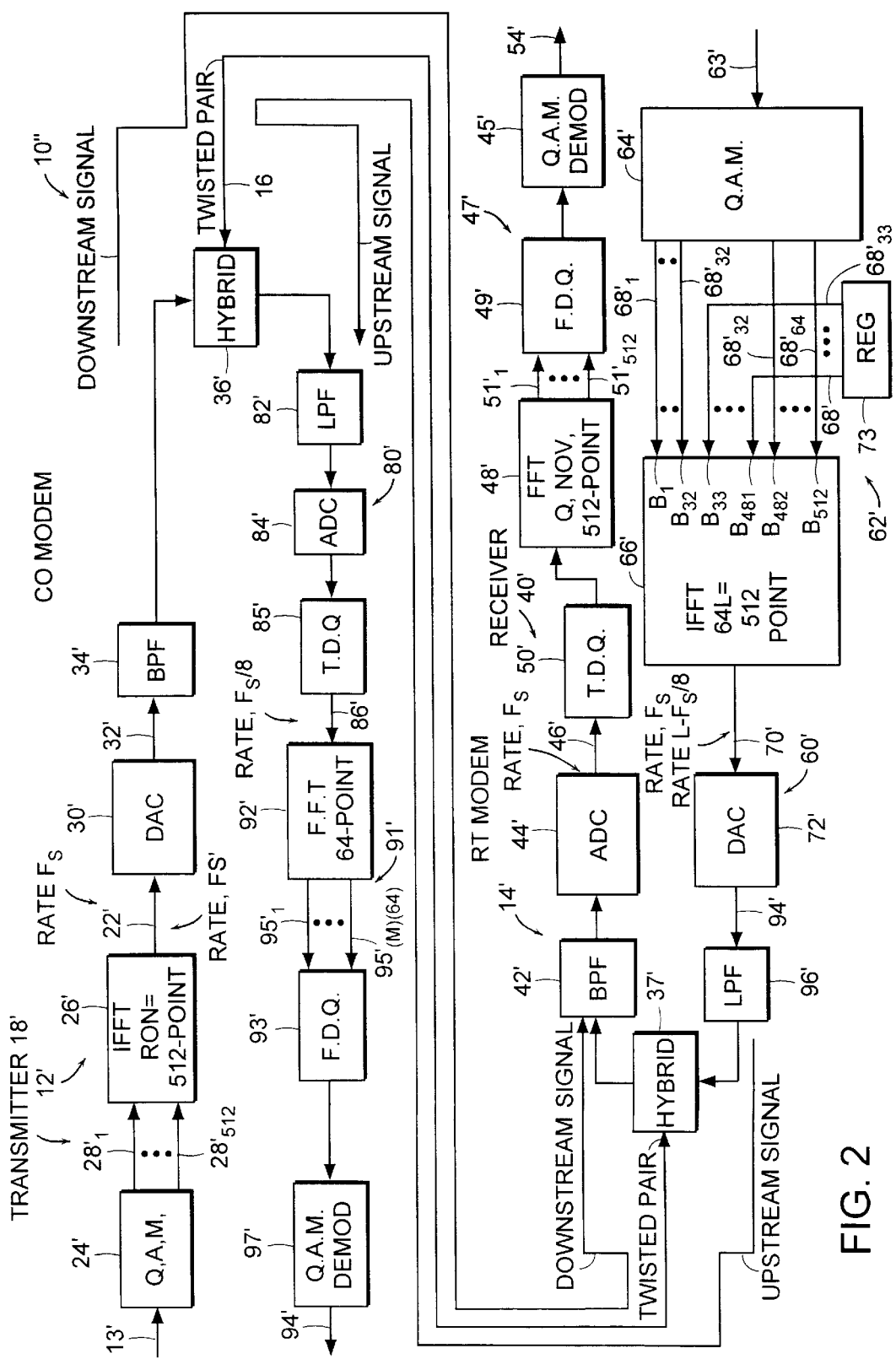
FIG. 2 is a block diagram of a DMT ADSL system according to the invention.

Referring now to FIG. 2, a DST ADSL system 10' is shown. System 10', like system 10 (FIG. 1), is a FDM system and is adapted to exchange information between a modem 12' at a first location station, here a central office (CO), and a modem 14' at a second station, or location, here a remote terminal (RT), through a common communication medium, here a twisted-pair telephone line 16. The system 10' includes: a transmitter section 18', at the first station, for distributing a first stream of data among a plurality of, here P carriers, corresponding to carriers 32 through 255. Thus, like system 10 in FIG. 1, a transmitter section 18' is provided at the central office modem 12', for distributing a first stream of data on bus 13' among a plurality of, $P \leq (N/2)-1$ carriers, (i.e., here N is 512 and therefore P is equal to, or less than, 255 carriers). More particularly, the transmitter section 18' of the central office modem 12' includes a modulator 20' for receiving frames of the data on line 13' and for distributing such data over carriers 32 through 255 for the FDM example. Thus, like modulator 20 in FIG. 1, the modulator 20' includes a Quadrature Amplitude Modulation (Q.A.M.) encoder 24' and an Inverse Fast Fourier Transformer (I.F.F.T.) 26' arranged as shown. The I.F.F.T. 26' is an RN point, where R is equal to, or greater than one. Here, R=1 and N=512. Thus, here I.F.F.T. 26' is a 512 point I.F.F.T. Thus, the incoming data on line 13' is selectively encoded by the Q.A.M. encoder 24' at a frame rate, $f_r$, here 4.0588 kHz, and the I.F.F.T. 26' produces, for each frame, a sequence of digital samples on line 22' at a rate $f_s=(N) f_r$, where here N is 256. More particularly, the sequence of digital samples on line 13' is encoded by Q.A.M. encoder 24' onto 255 conjugate data pairs on input lines $28'_1-28'_{512}$ of the I.F.F.T. 26' as a sequence of frames, here at a frame rate of approximately 4 kHz. It should be noted that the I.F.F.T. 26' has 512 frequency bins a pair of which correspond to each one of the 255 carriers for a total of 510 bins with the remaining two bins, i.e., bins 1 and 257, corresponding to dc and $f_s/2$, respectively. Each carrier is associated with a pair of input lines on bus $28'_1-28'_{512}$. Here, carrier 1, at 4.3125 kHz, is associated with the conjugate data on lines $28'_2$ and $28'_{512}$, carrier 2 is associated with the conjugate data on lines $28'_3$ and $28'_{511}$ carrier 3, . . . , carrier 255, corresponding to 1.1 MHz is associated with the conjugate data on lines $28'_{256}$, $28'_{258}$. Thus, for each frame of data fed to lines $28'_1-28'_{512}$ a sequence of digital samples is produced by the I.F.F.T. 26' on line 22' at a sampling rate of $f_s$=2.208 MHz. The data on lines $28'_2$, $28'_{512}$ modulates carrier 1, the data on lines $28'_3$, $28'_{511}$ modulates carrier 2, . . . , and the data on lines $28'_{256}$, $28'_{258}$ modulates carrier 255. Thus, the sequence of digital samples fed to the lines $28'_1-28'_{512}$ at the 4 kHz frame rate $f_r$ modulate the 255 carriers. As noted above, here the FDM system 10' will transmit only carriers 32–255. Thus, the data on carriers 2–32, (i.e., the conjugate data on pairs of lines $28'_2$, $28'_{512}$ through pairs of lines $28'_{32}$, $28'_{482}$) will be set to zero by control logic rather than to a value produced by the Q.A.M 24'.

The transmitter section 18' of the central office modem 12' also includes: a digital to analog converter 30' for converting the sequence of samples of digital samples into a corresponding analog signal on line 32' at a rate $f_s$; and a band pass filter 34', fed by the analog signal and having a pass band extending over the bandwidth of the P carriers, for producing, after passing through a conventional isolation hybrid 36' the downstream signal on the common communication medium 16 has a bandwidth extending over the P carriers 32 through 255 as described above in connection with FIG. 1.

The remote terminal modem 14' includes a receiver section 40' having: a band pass filter 42', coupled to the common communication medium 16 via a hybrid 37', for passing signals in the downstream signal fed there by the central office modem 12' transmitter section 18'. As noted above, the data in the downstream signal extends over the P carriers 32 through 255. An analog to digital converter 44' is provided for converting the signals passed by the band pass filter 42' into a sequence of digital data on line 46'. The data on line 46' is produced at the sampling rate, $f_s$. The data on line 46' is fed to a demodulator 47'. The demodulator 47' includes a Time Domain Equalizer (T.D.Q.) 50' followed by a Fast Fourier Transformer (F.F.T.) 48' followed by a Frequency Domain Equalizer (F.D.Q.) 49' and a Q.A.M. demodulator 45'. The F.F.T 48' is a QN point I.F.F. T, where Q is greater than or equal to one. Here, Q is equal to one and thus F.F.T 48' is a 512 point F.F.T. The F.F.T. 48' is fed by the sequence of data samples produced by the T.D.Q. 50' and separates such digital data in such samples on line 46' into a portion of the plurality of, (N/2)–1 carriers (i.e., carriers 1 through 255), it being understood that only the data in carriers 32 through 255 are of interest in this FDM system. More particularly, the F.F.T. 48' here provides a 512 point transform on the analog signal produced on line 46' by the T.D.Q. 50' to separate the analog signal on line 46' into 255 frequency bins. The conjugate data on pairs of lines $51'_2$, $51'_{512}$ correspond to carrier 1, the conjugate data on lines $51'_{3, 51'511}$ correspond to carrier 2, . . . , the data on conjugate pairs . . . and, the data in carrier 255 will be in a conjugate pair on lines $51'_{256}$ and $51'_{258}$. The data on lines $51'_1$–$51'_{512}$ is equalized by the F.D.Q. 49' and decoded by the Q.A.M. demodulator 45' into a signal on line 54' which, ideally, corresponding to the stream of data line 13'.

The remote terminal modem 14' includes a transmitter section 60', for distributing a second stream of data fed to the remote terminal modem 14' on bus 63' among carrier carriers 8 through 28 in this example of an FDM system. More particularly, the transmitter section 60' includes a modulator 62' for receiving data on line 63' and for distributing such data over carriers 8 through 28. The modulator 62' includes a Quadrature Amplitude Modulation (Q.A.M.) encoder 64' and an Inverse Fast Fourier Transformer (I.F.F.T.) 66' arranged as shown. More particularly, a sequence of digital samples on line 63' is encoded by Q.A.M. encoder 66' as a sequence of frames, here at a frame rate of approximately 4 kHz. Thus, for each frame of data fed to lines $68'_1$–$68'_{NL/K}$, a sequence of digital samples is produced by the I.F.F.T. 66' on line 70' at a rate of $Lf_s/K$. It is noted that the sequence of digital samples fed to each one of the lines $68'_1$–$68'_{NL/K}$ at the approximately 4 kHz frame rate $f_r$ appear in one of the 31 carriers of the upstream signal. Thus, the conjugate data on lines $68'_2$, $68'_{NL/K}$ will appear in carrier 1, the conjugate data on lines $68'_3$, $68'_{[NL/K]-1}$ will appear in carrier 2, . . . and, the conjugate data on lines $68'_{32}$, $68'_{[NL/K]-30}$ will appear in carrier 31. Here, the Inverse Fast Fourier Transformer (I.F.F.T.) 66' is an NL/K point I.F.F.T. The I.F.F.T 66' performs transforms at a rate, $f_r$, and generates output data at a sampling rate of $NLf_r/K=Lf_s/K$. Thus, the I.F.F.T. 66' produces for each frame a sequence of digital samples on bus 63' at a rate $f_s=Lf_s/K$. Thus, for each frame of data fed to bus 63, a sequence of digital samples is produced by the I.F.F.T. 66' on line 70' at a rate of $Lf_s/K$.

Considering the case where L=8, the I.F.F.T. 66' will have 512 input bins, or input ports, $B_1$–$B_{512}$. Conjugate data on input bins $B_2$, $B_{512}$ will appear in carrier 1, conjugate data on bins $B_3$, $B_{511}$ will appear in carrier 2, . . . and, conjugate data on bins $B_{32}$, $B_{482}$ will appear in carrier 31. It is noted that data equal to 0 is fed to bins $B_{33}$–$B_{481}$ from a register 73. To put it another way, I.F.F.T. 66' is an NL/K=512, in this example, point I.F.F.T. even though it is used to distribute the data on line 63' among only 31 carriers. That is, I.F.F.T. 66' is oversized. This, in effect, implements an 8× (i.e. eight times in this example for L=8) oversampling of the upstream signal band, if it is limited to carrier 31 in bandwidth. The current ANSI standard allocates carriers 1–31 for the upstream signal and carriers 1–255 for the downstream signal. Compliance with the ANSI standard is maintained by setting the signals in the frequency domain vector to zero in the appropriate frequency bins. This is readily accomplished with a 512 transform by setting bins 33—481 (i.e., lines $68_{33}$–$68_{481}$) to zero, as shown. A digital to analog converter 72' is fed the data on line 70' for converting the digital data on line 70' into an analog signal. A lowpass filter 96' is fed by the analog signal and has a bandwidth extending over carriers 1 through 28 in this FDM example, for producing, after passing through a conventional isolation hybrid 37' the upstream signal on the common communication medium 16 has a bandwidth extending over carriers 8 through 28.

The central office modem 12' includes a receiver section 80' having: a lowpass filter 82', with a bandwidth and stop band to be described below. The output of the lowpass filter 82' is fed to ADC 84'. The ADC 84' produces digital samples at a rate $Mf_s/K$, where M is greater than one and K is the ratio of the downstream to the upstream bandwidths (K=8 for the ANSI standard). The digital samples produced by the ADC 84' at the rate $Mf_s/K$.

The sequence of samples produced by the ADC 84' are fed to a demodulator 91'. The demodulator 91' includes a T.D.Q. 85' followed by an NM/K-point F.F.T. 92' followed by an F.D.Q. 93' followed by a Q.A.M. demodulator 97'. The F.F.T. 92' separates the analog signal on line 86 into 31 frequency bins, or carriers on lines $95'_1$–$95'_{(NM/K)}$. Thus, if M=8, the output lines of the F.F.T. 92' will be lines $95'_1$–$95'_{512}$. The data in carrier 1 will be on lines $95'_2$ and $95'_{512}$, . . . , and the data on carrier 31 will be on lines $95'_{32}$ and $95'_{482}$. The F.F.T. 92 operates at a rate $f_s/8$, to produce frames of data at the approximate 4 kHz frame rate among carriers 1 through 31; it being understood that the data of interest will appear in carriers 8 through 28. That is, the F.F.T. 92' separates the signal on line 86 into the lower carriers 1–31 (it being understood that only carriers 8 through 28 are of interest). The F.D.Q. 93' and Q.A.M. demodulator 97' equalize and demodulate the data produced by the F.F.T. 92' into a signal on line 94 which, ideally, is a replica of the signal on line 63'.

Thus, T.D.Q./F.F.T. 92' operates at a rate of $M*f_s/K$ and separates the digital data fed thereto by the T.D.Q. 85' at the rate of $M*f_s/K$, into [(NM)/(2K)]–1 carriers (i.e., into carriers 1 through 255); it being understood that the data of interest will, for N=512, M=K=8, appear in carrier 8 through 28 for the FDM example.

With the system 10' shown in FIG. 2, having the same transform size I.F.F.T. 66' and F.F.T. 92' in the upstream path as the size of the I.F.F.T. 26' and F.F.T. 48' in the downstream path, the aliasing and imaging problems discussed above in connection with the system 10 in FIG. 1 are overcome. In other words, in system 10' with K=L=M=8, 512 point transforms are performed in both directions (i.e., in both the upstream and down stream signals). As a result, the upstream signal sample rate becomes equal to the downstream signal sample rate and the DAC 72' and ADC 84' in the upstream signal path operate 8 times faster than in system 10, FIG. 1. This, in effect, implements an 8× (i.e. eight times) oversampling of the upstream signal band, if it is limited to carrier 31 in bandwidth. It is noted that with system 10', the larger upstream transform size (i.e., a 512 point transform (e.g. L=M=8) vs. the 64 point transform size of system 10), accommodates upstream carrier allocations all the way up to carrier 255. Thus, system 10' has flexibility which makes the modems capable of handling different combinations of upstream and downstream carrier assignments and hence data rates. That is, many applications require combinations of upstream and downstream data rates that are not possible following the ANSI standard and it is often desirable to have a higher upstream data rate than specified. System 10' easily handles these varied requirements. For example, symmetric upstream and downstream data rates are possible by appropriate carrier allocations, e.g. carriers 8–75 upstream and 80–255 downstream as an example of an FDM allocation.

It should be noted than M and L need not be eight. Other transform sizes that are powers of two larger than N/K may be used. That is, M or L may be any number greater than one. Specifically, the upstream transform sizes of NL/K, where L is greater than one, can be used at the transmitter 18' (i.e., for F.F.T. 92') and transform sizes of NM/K, where M is greater than one, can be used at the upstream receiver 60' (i.e, for F.F.T. 66'). Note that M and L are independent and can be different. Also note that the values of M or L that are powers of two result in F.F.T.s that are likewise powers of two (providing K is also a power of two) and are simpler to implement using fast transforms. The choice of L and M dictate the amount of oversampling that is used in the transmitter 60' and receiver 80', respectively, and increasing these parameters relaxes the selectivity requirements of the low pass filters 96', 84' in the upstream signal path. The following table shows the relationship between the oversampling factor L or M, for K=8, and the analog low pass filter 96', 84' requirements; the larger L or M is, the wider the separation between passband frequency (at $f_s/16$) and stopband frequency and hence the lower the required order of the analog low pass filters 96', 92':

| Oversampling Ratio (L or M) | Analog lowpass filter 96' or 84' Stopband Frequency | Analog lowpass filter 96' or 84' Shape Factor |
|---|---|---|
| 1 | $f_s/16$ | 1 |
| 2 | $3f_s/16$ | 3 |
| 3 | $5f_s/16$ | 5 |
| 4 | $7f_s/16$ | 7 |
| L | $(2L-1)f_s/16$ | 2L-1 |

As noted above, a transform size of NL/K or NM/K can be used for the upstream transmitter 60' and receiver 80', respectively, and values of L and M that are powers of two are desirable for implementation of fast algorithms. Note that large values of L or M correspond to high amounts of oversampling in the upstream transmitter 60' or receiver 80' and have potential advantages. Large L or M might be attractive, for example, to accommodate the use of oversampled sigma-delta data converters, or to simply allow oversampling of a conventional converter to reduce quantization noise.

Figure 3:
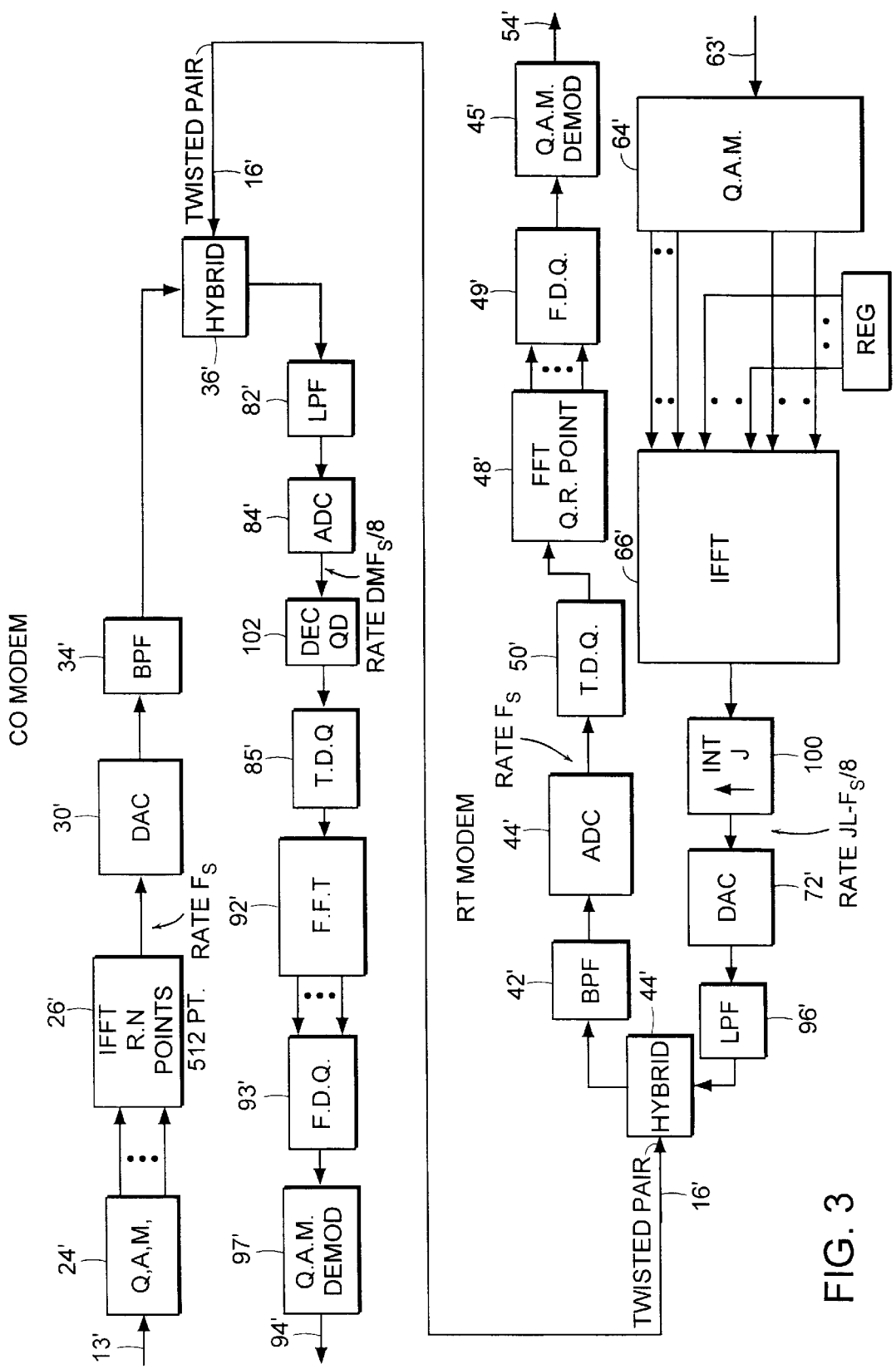
FIG. 3. is a block diagram of a DMT ADSL system according to another embodiment of the invention
Figure 4:
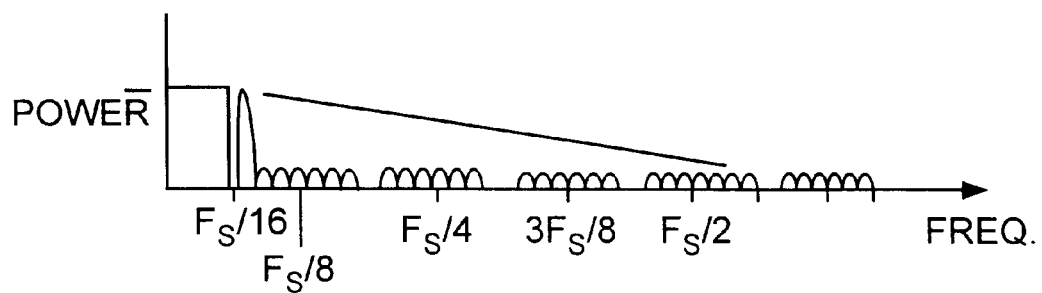
FIG. 4 is a curve showing the power spectrum of the upstream transmitted signal using the system shown in FIG. 3 with an interpolator having an interpolation factor, J, of 8.

Referring now to FIG. 3, a modification to system 10' is shown. Equivalent elements are designated with the same numerical designation. Here, the I.F.F.T. 66' is followed by a digital interpolator 100 at the upstream transmitter 60' and/or a digital decimator 102 is used prior to the T.D.Q 85' at the upstream receiver 80'. The interpolation ratio of the interpolator 100 is J. The decimator 102 has a decimation ratio D. At the transmitter 60', the cascade of the oversize I.F.F.T. 66' and interpolator 100 results in a sampling rate for DAC 72' of $JLf_s/K$. At the receiver 80', the cascade of the decimator 102 and the oversize F.F.T. 92' results in a sampling rate at ADC 84' of $DMf_s/K$. As indicated above, the oversampled data conversion alleviates the imaging and aliasing problem with the downstream signal in system 10 (FIG. 1) and allows much simpler analog lowpass filters 96', 82' to be used in the upstream signal path. Specifically, the shape factor of the transmit and receive lowpass filters 96', 82' are relaxed by factors of 2JL-1 and 2DM-1, respectively.

It should be noted that oversampling, through use of a larger transform size than 512 points, can be applied to the downstream path as well to reduce images of the downstream signal. Since the DMT signal itself goes up to $f_s/2$, its images are difficult to filter with analog techniques. It is possible to oversample the transmitter 18' using a larger transform 26' size than 512 points followed by a DAC and filter. This increase in sample rate shifts the DAC images up in frequency and greatly reduces the requirements on the analog filter. Similarly, the downstream receiver 46' can benefit by employing an oversampled ADC followed by a T.D.Q. and finally an F.F.T. at a higher transform size. This also reduces the required selectivity of the analog filter preceding the ADC. In addition to simplifying analog filtering, the oversampling here also lowers the quantization noise of the ADC and DAC in the downstream signal path and allow use of sigma delta data converters. Also, the oversampling facilities use of dynamic element matching techniques that improve the linearlity of untrimmed DACs and ADCs.

With the systems shown in FIGS. 2 and 3, digital signal processors (DSPs) may be used instead of analog filtering. Increasing sample rates using large, i.e., oversize, F.F.T.s and I.F.F.T.s, adds no phase shift to the system. Analog filtering of a Nyquist rate system on the other hand introduce group delay and intersymbol interference that can be difficult to equalize. Also, a DSP approach such as this has exact specifications that do not vary in manufacture due to component variations as with analog filters.

FIG. 6 shows the power spectrum of the upstream transmitted signal using a interpolator 100 with J=8.

Other embodiments are within the spirit and scope of the appended claims. For example, while an FDM system has been described, the invention also applies to an echo-cancellation system equally well. In an echo cancellation system, the upstream and downstream signals can partially overlap. For example, downstream carrier allocation may be carriers 8–255 and upstream carrier allocation carriers 8–31 such that the upstream allocation overlaps a portion of the downstream carriers.

What is claimed is:

1. An asymmetrical modem system wherein a modem at a first location transmits information to a modem at a second location on a downstream signal and the modem at the second location transmits information to the modem at the first location on an upstream signal, such upstream and downstream signals passing through a common transmission medium, such system comprising:

a first location transmitter section, having an N-point inverse frequency transform, for converting information into the downstream signal having up to (N/2)−1 carriers;

a second location transmitter section having, an [N/K]L-point inverse frequency transform, for converting information into the upstream analog signal having up to [(N)/(2K)]–1 carriers, where K the ratio of downstream signal bandwidth to upstream signal bandwidth, and L is greater than one;

a receiver section at the first location, having an [N/K] M-point frequency transform, for separating the upstream signal into up to [(N)/(2K)]–1 carriers, where M is greater than one;

a receiver section at the second location, having an N-point frequency transform, for separating the downstream analog signal into up to [(N/2)–1] downstream carriers where N, K, L and M are integers.

2. The system recited in claim 1 wherein K is a power of 2.

3. The system recited in claim 1 wherein L/K is a power of 2.

4. The system recited in claim 1 wherein M/K is a power of 2.

5. An asymmetrical modem system wherein a modem at a first location transmits information to a modem at a second location on a downstream signal and the modem at the second location transmits information to the modem at the first location on an upstream signal, such upstream and downstream signals passing through a common transmission medium, such system comprising:

a first location transmitter section, having an N-point inverse frequency transform, for converting information into the downstream signal having up to (N/2)–1 carriers;

a second location transmitter section having, an [N/K]L-point inverse frequency transform, for converting information into the upstream analog signal having up to [(N)/(2K)]–1 carriers, where K is the ratio of downstream signal bandwidth to upstream signal bandwidth, and L is greater than one;

a receiver section at the first location, having an [N/K]-point frequency transform, for separating the upstream signal into up to [(N)/(2K)]–1 upstream carriers; and a receiver section at the second location, having an N-point frequency transform, for separating the downstream analog signal into [(N)/(K)]–1 downstream carriers where N, K, and L are integers.

6. An asymmetrical modem system wherein a modem at a first location transmits information to a modem at a second location on a downstream signal and the modem at the second location transmits information to the modem at the first location on an upstream signal, such upstream and downstream signals passing through a common transmission medium, such system comprising:

a first location transmitter section, having an N-point inverse frequency transform, for converting information into the downstream signal having up to (N/2)–1 carriers;

a second location transmitter section having, an [N/K]-point inverse frequency transform, for converting information into the upstream analog signal having up to [N/2 K)]–1 carriers, where K is the ratio of downstream signal bandwidth to upstream signal bandwidth;

a receiver section at the first location, having an [N/K] M-point frequency transform, for separating the upstream signal into up to [(N)/(2K)]–1 upstream carriers, where M is greater than one;

a receiver section at the second location, having an N-point frequency transform, for separating the downstream analog signal into up to (N/2)–1 downstream carriers where N, K, and M are integers.

7. An asymmetric digital subscriber loop system, comprising:

a first location transmitter section, having an N-point inverse frequency transform, for converting information into a downstream analog signal having up to (N/2)–1 carriers;

a second location transmitter section having, an [N/K]L-point inverse frequency transform, for converting information into an upstream analog signal having up to [(N)/(2K)]–1 carriers, where K is the ratio of upstream signal bandwidth to downstream signal bandwidth and L is greater than one;

a receiver section at the first location, having an [N/K] M-point frequency transform, for separating the upstream analog signal into up to [(N)/(2K)]–1 upstream carriers where M is greater than one; and a receiver section at the second location, having an N-point frequency transform, for separating the downstream analog signal into up to (N/2)–1 downstream carriers where N, K, L and M are integers.

8. An asymmetric digital subscriber loop system, comprising:

a first location transmitter section having: an N-point inverse frequency transform for transforming each of a series of frames of N downstream data items fed to the transform at a frame rate, $f_r$, into a series of, N, digital downstream signal samples at a sampling rate, $f_s$, to distribute such frame downstream data items among a plurality of up to (N/2)–1 downstream carriers and a converter section for converting the downstream signal samples into a downstream analog signal;

a second location transmitter section having: an [(NL)/K]-point inverse frequency transform for transforming each of a series of frames of [(NL)/K] upstream data items, where K is the ratio of downstream signal bandwidth to upstream signal bandwidth, and L is greater than one, fed to the transform at a frame rate, $f_r$, into a series of, [(NL)/(K)], upstream digital samples at a sampling rate $Lf_s/K$ to distribute such frame upstream data items among a plurality of up to [(N)/(2K)]–1 upstream carriers and a converter section for converting such upstream digital samples into an upstream analog signal;

a receiver section at the first location for receiving the upstream analog signal and having: a converter section for converting the received upstream analog signal into a series of digital samples at a sampling rate $[M/K]f_s$; and, an [(NM)/K]-point frequency transform for separating the digital samples into up to [(N)/(2K)]–1 carriers, where M is greater than one; and a receiver section at the second location for receiving the downstream analog signal and having: a converter section for converting the received downstream analog signal into a series of digital samples at a sampling rate $f_s$; and, an N-point frequency transform for separating the digital samples into up to (N/2)–1 downstream carriers where N, K, L and M are integers.

9. An asymmetrical modem system wherein a modem at a first location transmits information to a modem at a second location on a downstream signal and the modem at the second location transmits information to the modem at the first location on an upstream signal, such upstream and downstream signals passing through a common transmission medium, such system comprising:

a first location transmitter section, having an N-point inverse frequency transform, for converting information into the downstream signal having up to (N/2)–1 carriers; and, a receiver section at the first location, having an [N/K] M-point frequency transform, for separating the upstream signal into up to [(N)/(2K)]–1 carriers, where K is the ratio of downstream signal bandwidth to upstream signal bandwidth and M is greater than one.

10. The system recited in claim 9 wherein K is a power of 2.

11. The system recited in claim 9 wherein M/K is a power of 2.

12. An asymmetric digital subscriber loop system wherein a modem at a first location transmits information to a modem at a second location on a downstream signal and the modem at the second location transmits information to the modem at the first location on an upstream signal, such upstream and downstream signals passing through a common transmission medium, such system comprising:

a first location transmitter section having: an N-point inverse frequency transform for transforming each of a series of frames of N downstream data items fed to the transform at a frame rate, $f_r$, into a series of, N, digital downstream signal samples at a sampling rate, $f_s$, to distribute such frame downstream data items among a plurality of up to (N/2)–1 downstream carriers; and a converter section for converting the downstream signal samples into a downstream analog signal; and a receiver section at the first location for receiving the upstream analog signal and having: a converter section for converting the received upstream analog signal into a series of digital samples at a sampling rate $[M/K]f_s$; and, an [(NM)/K]-point frequency transform for separating the digital samples into up to [(N)/(2K)]–1 carriers, where K is the ratio of downstream signal bandwidth to upstream signal bandwidth and where M is greater than one.

13. An asymmetrical modem system wherein a modem at a first location transmits information to a modem at a second location on a downstream signal and the modem at the second location transmits information to the modem at the first location on an upstream signal, such upstream and downstream signals passing through a common transmission medium, such system comprising:

a second location transmitter section having, an [N/K]L-point inverse frequency transform, for converting information into the upstream analog signal having up to [(N)/(2K)]–1 carriers, where K is the ratio of downstream signal bandwidth to upstream signal bandwidth, and L is greater than one;

a receiver section at the second location, having an N-point frequency transform, for separating the downstream analog signal into up to [(N/2)–1] downstream carriers where N, K, and L are integers.

14. The system recited in claim 13 wherein K is a power of 2.

15. The system recited in claim 14 where L/K is a power of 2.

16. An asymmetric digital subscriber loop system wherein a modem at a first location transmits information to a modem at a second location on a downstream signal and the modem at the second location transmits information to the modem at the first location on an upstream signal, such upstream and downstream signals passing through a common transmission medium, such system comprising:

a second location transmitter section having: an [(NL)/K]-point inverse frequency transform for transforming each of a series of frames of [(NL)/K] upstream data items, where K is the ratio of downstream signal bandwidth to upstream signal bandwidth, and L is greater than one, fed to the transform at a frame rate, $f_r$, into a series of, [(NL)/(K)], upstream digital samples at a sampling rate $NLf_r/K$ to distribute such frame upstream data items among a plurality of up to [(N)/(2K)]–1 upstream carriers and a converter section for converting such upstream digital samples into an upstream analog signal;

a receiver section at the second location for receiving the downstream analog signal and having: a converter section for converting the received downstream analog signal into a series of digital samples at a sampling rate $f_s$; and, an N-point frequency transform for separating the digital samples into up to (N/2)–1 downstream carriers where N, K, and L are integers.

17. An asymmetric digital subscriber loop system, comprising:

a first location transmitter section, such first location transmitter section having a modulator, having an RN-point inverse frequency transform, for converting information into a downstream analog signal having a plurality of up to, P, downstream carriers, where R greater than one and P is (N/2)–1;

a second location receiver section having a demodulator, having an QN-point frequency transform, for separating the downstream analog signal into the P downstream carriers, where Q is equal to or greater than one where P, Q, R and N are integers.

18. An asymmetric digital subscriber loop system, comprising:

a first location transmitter section, such first location transmitter section having a modulator, having an RN-point inverse frequency transform, for converting information into a downstream analog signal having a plurality of up to, P, downstream carriers, where P is (N/2)–1;

a second location receiver section having a demodulator, having an QN-point frequency transform, for separating the downstream analog signal into the P downstream carriers, where either R or Q is greater than one where P, Q, R and N are integers.

19. An asymmetrical digital subscriber loop modem, comprising:

a transmitter section having an N-point inverse frequency transform, for converting information into a downstream signal having up to P=(N/2)–1 carriers;

a receiver section having an [N/K]M-point frequency transform, for separating an upstream signal into up to P'=[(N)/(2K)]–1 carriers, where M is greater than one, and K is the ratio of downstream signal bandwidth to upstream signal bandwidth where N, P, K and M are integers.

20. An asymmetrical digital subscriber loop modem, comprising:

a transmitter section having, an [N/K]L-point inverse frequency transform, for converting information into an upstream analog signal having up to P'=[(N)/(2K)]–1 carriers;

a receiver section, having an N-point frequency transform, for separating a downstream analog signal into up to P=[(N/2)–1] downstream carriers, where K the ratio of downstream signal bandwidth to upstream signal bandwidth, and L is greater than one where N, K, and L are integers.

21. The system recited in claims 1, 2, 3, 4, 5, 6, 13, 14, 15, 16, 17 or 18 including an interpolator having an input coupled to an output of the second location [N/K]L-point inverse frequency transform.

22. The system recited in claim 21 wherein the interpolator has an interpolation factor J, where J is greater than one where J is an integer.

23. The system recited in claims 1, 2, 3, 4, 5, 6, 7, 8, 9, 10, 11, or 12 including a decimator disposed before the first location receiver section frequency transform.

24. The system recited in claim 23 wherein the decimator has an decimation factor D, where D is greater than one where D is an integer.

* * * * *